May 17, 1955

J. B. CUNNINGHAM 2,708,649

METHOD AND APPARATUS FOR DIELECTRIC PROJECTION BONDING OF WOOD MATERIALS

Filed Jan. 19, 1952

JACK B. CUNNINGHAM
INVENTOR.

BY *Forrest J. Hilly*

ATTORNEY.

May 17, 1955
J. B. CUNNINGHAM
2,708,649
METHOD AND APPARATUS FOR DIELECTRIC PROJECTION BONDING OF WOOD MATERIALS
Filed Jan. 19, 1952
4 Sheets-Sheet 2
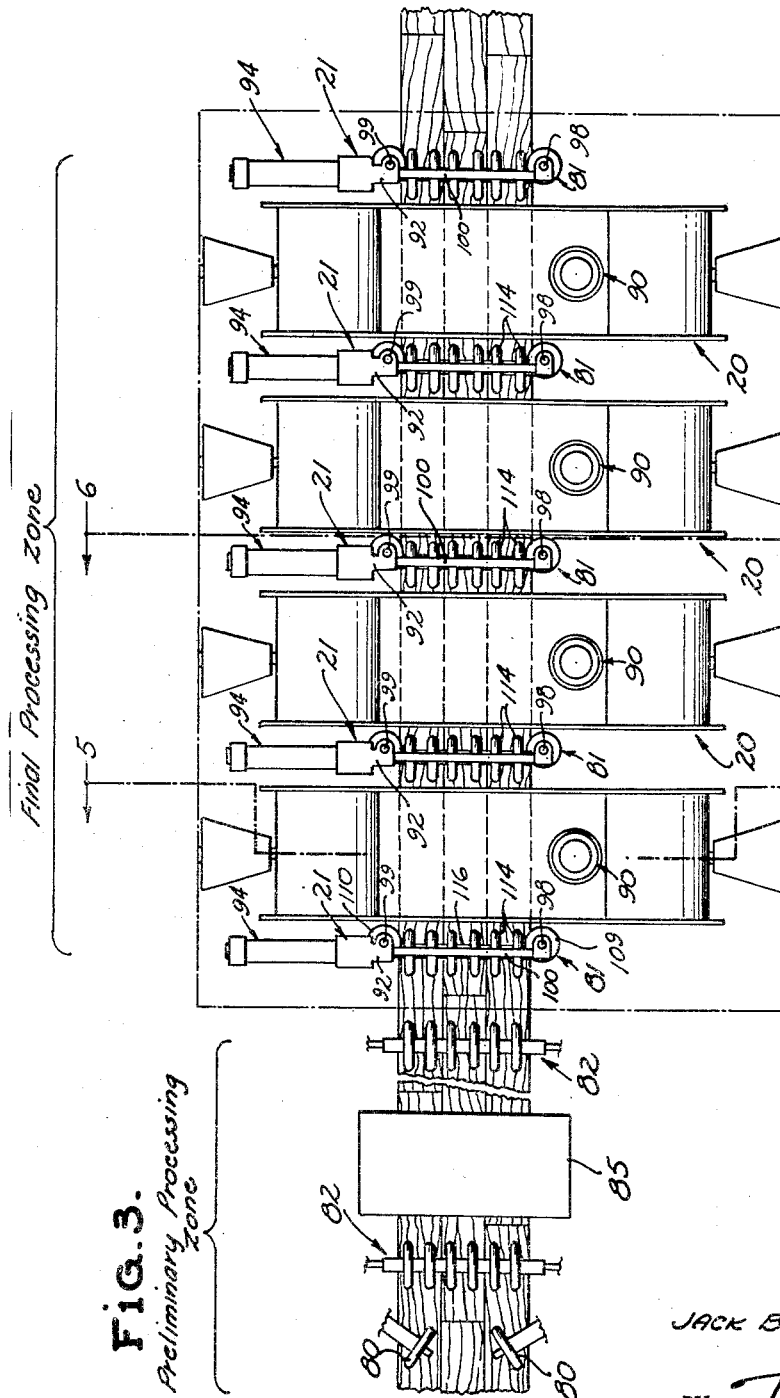
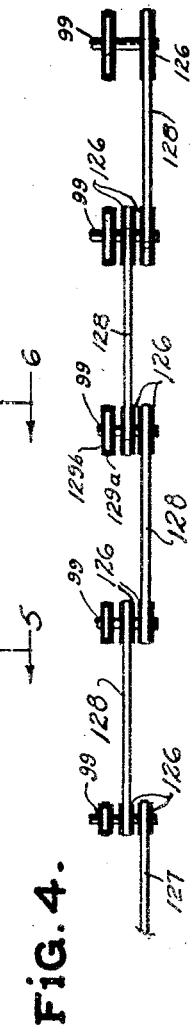
FIG. 3.
FIG. 4.
JACK B. CUNNINGHAM
INVENTOR.
BY *Forrest J. Lilly*
ATTORNEY.

May 17, 1955     J. B. CUNNINGHAM     2,708,649
METHOD AND APPARATUS FOR DIELECTRIC PROJECTION
BONDING OF WOOD MATERIALS
Filed Jan. 19, 1952     4 Sheets-Sheet 3

JACK B. CUNNINGHAM
INVENTOR.

BY *Forest J. Lilly*

ATTORNEY.

JACK B. CUNNINGHAM
INVENTOR.

BY

ATTORNEY.

United States Patent Office 2,708,649
Patented May 17, 1955

2,708,649

METHOD AND APPARATUS FOR DIELECTRIC PROJECTION BONDING OF WOOD MATERIALS

Jack B. Cunningham, North Hollywood, Calif.

Application January 19, 1952, Serial No. 267,270

6 Claims. (Cl. 154—116)

My invention relates to means and methods for fabricating composite bodies of the general type in which a plurality of pieces of non-metallic material are bonded together by a suitable thermal setting adhesive into a unitary whole by use of dielectric heating procedures.

The invention provides typically a method and apparatus for the production of a composite strip or board comprising pieces of scrap lumber or similar material bonded together edge-to-edge and end-to-end by a suitable heat-responsive glue such as a thermal setting synthetic resin glue. Such a disclosure will illustrate the underlying principles and will provide adequate guidance for applying the invention wherever it may have utility in uniting pieces of material either edge-to-edge, face-to-face, or end-to-end.

In the present example, pieces of wood are assembled end-to-end in a plurality of longitudinal rows, and the rows are assembled edge-to-edge to form a composite board of substantially uniform width. This procedure is especially suited for utilizing lumber offal.

The usual fabrication procedure to produce such a composite board includes the steps of providing layers of glue between the adjoining surfaces of the assembled pieces, placing the assembly under sufficient pressure to bring the pieces together in intimate bonding relation and, while the assembly is under such pressure, applying heat to cure the glue. In the more advanced prior art procedures the synthetic resin glue is intermixed with a suitable catalyst before application to the pieces, the required pressure is applied by clamping means, and the heat treatment is carried out by placing against the assembly suitable radio frequency electrodes to cure the glue by dielectric heating.

The general object of my invention is to improve on such a fabrication procedure, preferably in a manner permitting continuous fabrication, but in any event to carry out the necessary steps efficiently and with special provisions for meeting certain problems that have been especially troublesome in the art. The features and advantages of the invention may best be understood in the light of these problems.

One problem is to avoid glue-starved joints in the final product. I have traced this problem back to two primary causes, first, the gumming of glue spreading devices by partially polymerized glue resulting in defective glue distribution, and, second, premature extrusion of glue from the joints by applied pressure before the glue properly penetrates the adjoining surfaces.

I avoid the first cause by using liquid glue and liquid catalyst separately and not only using separate spreaders to apply the two liquids but also applying the two coats to separate surfaces of the assembly. Thus I avoid any possible polymerization that might interfere with efficient glue distribution.

As for the second cause, premature extrusion, my invention is characterized by a preliminary processing stage before the final glue cure, in which preliminary stage the matched coatings of glue and catalyst are brought into mutual contact under only light pressure for intermixture of the two coatings. This preliminary stage is prolonged to permit effective penetration of the adjoining surfaces before extruding pressure is applied in the final processing stage.

Another problem to be met is the effective application and maintenance of uniform pressure across the assembly during the final curing stage. This problem is especially difficult when the pressure must be applied to a moving assembly in a continuous process. Here again I have found two underlying causes for the difficulty, first, the serious interference with pressure distribution across the moving assembly by the heavy frictional contact of the usual electrodes with the face of the assembly, and second, the fact that minor variations in the transverse resilience and the over-all width of the traveling assembly are not followed with uniform effectiveness by the usual clamping devices.

I have eliminated the first of these two causes by eliminating the use of electrodes in the dielectric heating of the glue layers, and I have met the second cause by employing a novel clamping arrangement in which the pressure elements "float" to follow width changes in the traveling assembly and are fluid-pressure-actuated for constant uniform compression of the assembly.

With the above obstacles overcome, the glue is still to be cured properly and there is the all-important problem of effectively applying radio frequency energy for this purpose.

It has already been pointed out that polymerization is delayed until the glue and catalyst coatings are brought together for the preliminary processing stage. The value of this close timing control in achieving uniform curing will be readily appreciated, and especially so in a continuous process. All glue layers enter the final stage of dielectric heating with initial polymerization advanced to the same degree, an advantage that is impossible when the glue and catalyst are mixed in batches for use in glue spreaders.

The most important advance in the curing of the glue layers, however, resides in the use of a cavity resonator to generate and apply radio frequency energy for dielectric heating of the glue. A number of advantages are involved here, as will be explained later in the disclosure.

The above and further objects and advantages of the invention will be apparent in the following detailed description taken with the accompanying drawings.

In the drawings, which are to be regarded as merely illustrative:

Figure 3 is a plan view of suggested apparatus for processing the traveling assembly;

Figure 4 is a fragmentary view in side elevation showing how the mechanism of Figure 3 is actuated;

*General arrangement*

Figure 1:
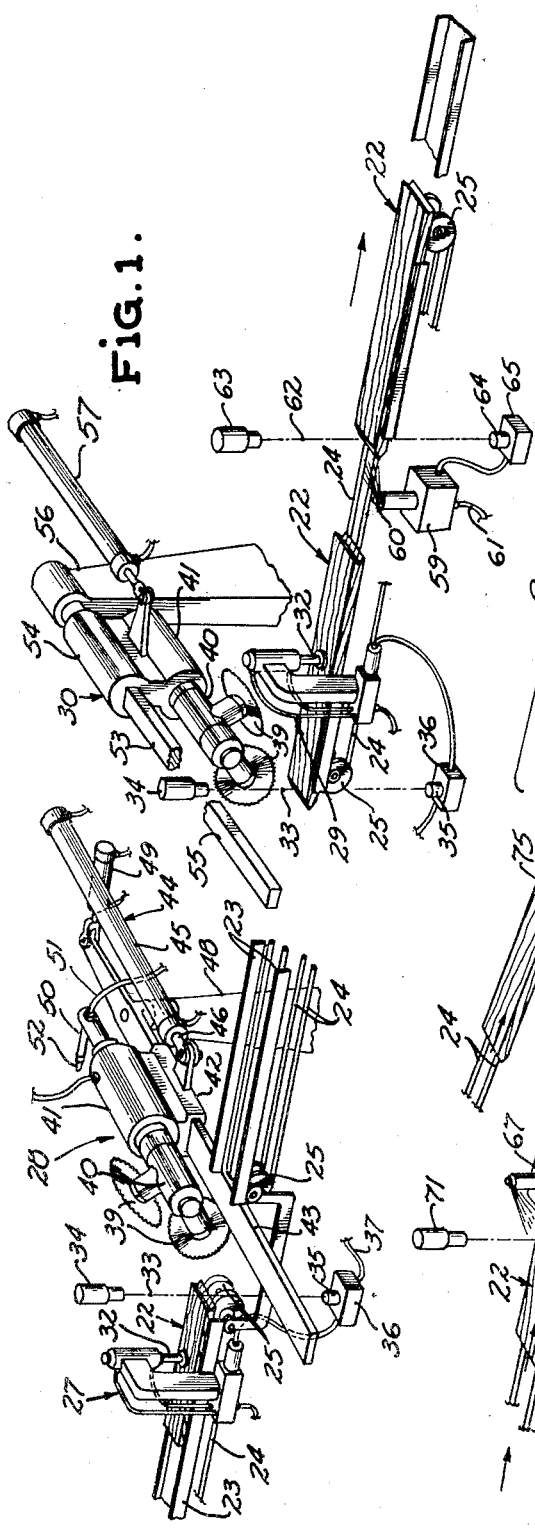
Figure 1 is a fragmentary perspective view of an arrangement that may be used to cut and shape the individual pieces of wood that are to make up the composite board.
Figure 2:
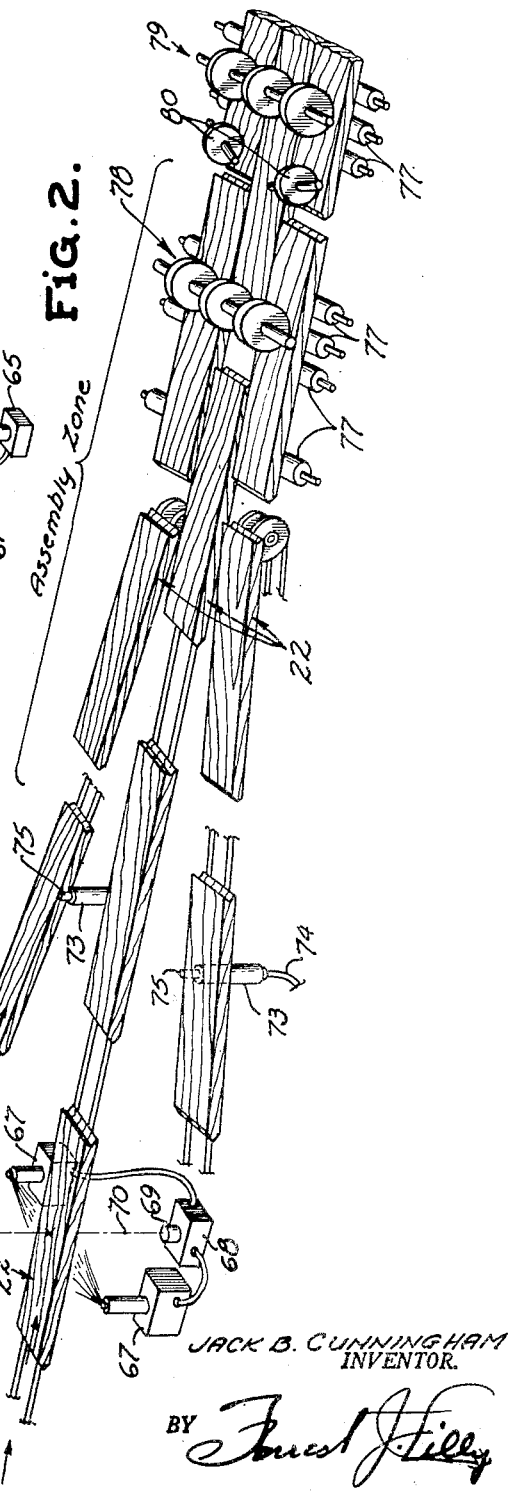
Figure 2 is a fragmentary view, more or less diagrammatic, showing how the individual pieces of wood are continuously organized into a traveling assembly.

Figures 1 to 3 disclose by way of example how an apparatus may be constructed for the continuous fabrication of a composite strip or board in accord with the teachings of the invention. It will be apparent to those skilled in the art that other forms of apparatus may be used to carry out substantially the same steps.

For simplicity and clarity of illustration the drawings show three rows of pieces of wood cut from lumber offal to make up the composite board. The pieces in the different rows are shown as cut to the same width, but it is to be understood, that the three rows need not be of the same width, and that there may be any number of rows.

Figure 1 shows how the pieces of wood may be cut and shaped and coated on their opposite ends with glue and catalyst respectively. While any suitable adhesive may be used, a suitable synthetic resin glue of the urea or resorcinol type is preferred. Figure 2 shows how catalyst and glue coatings respectively may be applied to adjoining side surfaces respectively of the individual pieces.

The three rows of pieces with their separated glue and catalyst coatings now enter the assembly zone in Figure 2 where the three rows of pieces are brought together into a traveling assembly having the configuration of the final composite board. Here all of the pieces are brought together into a compact arrangement with the glue and catalyst coatings intermingled for the first time to initiate polymerization of the glue.

Under relatively light transverse and longitudinal pressure, the assembly travels through the preliminary processing zone shown in Figure 3 for a certain period of time that permits a certain degree of polymerization of the glue and also permits the glue to penetrate the surfaces of the pieces of wood. At the end of this time period, the traveling assembly reaches the final processing zone of Figure 3 where the assembly is placed under relatively high transverse and longitudinal pressure, and at the same time passes through a series of cavity resonators generally designated 20 in which the layers of glue are cured by dielectric heating. The required transverse and longitudinal pressures are applied in this final processing zone by what may be termed a floating pressure assembly comprising a series of compression units generally designated 21.

*Preparatory cutting, shaping and coating*

Before entering the assembly zone of Figure 2, the individual pieces of wood may be cut, trimmed and shaped to fit together in any suitable manner. Figure 1 shows, by way of example, the essential working parts of automatic mechanisms that may be used for this purpose. In further preparation for the assembly zone, the pieces of wood are given separate coats of glue and catalyst on separate surfaces and any suitable devices may be used for this purpose.

Figure 1 shows a series of pieces of wood, generally designated 22, in various stages of preparation. The individual pieces 22 are carried forward by a series of suitable belt conveyers, each of which may include a pair of guide rails 23 and two narrow belts 24 carried by suitably actuated rolls 25. The essential mechanisms for cutting the ends of the pieces 22 include: a first automatic clamp generally designated 27 to hold the pieces 22 for the first end-cutting operation; a first end-cutting unit generally designated 28; a second automatic clamp generally designated 29 to hold the pieces for a second end-cutting operation; and a second end-cutting unit generally designated 30.

The first automatic clamp 27 is of a well known construction with an upper fluid-pressure-actuated jaw 32, and a lower fixed jaw (not shown) that lies between the two belts 24. The operation of the clamp may be either pneumatic or hydraulic, but hydraulic is preferred. When the leading edge of a piece of wood 22 cuts the light beam from a lamp 34, a photoelectric cell 35 in a suitable control box 36 causes the clamp 27 to grip the piece rigidly for the first cutting operation. At the same time the control box 36, acting through a cable connection 37, initiates the operating cycle of the end-cutting unit 28.

In this example, pieces 22 are intended to fit together at their ends by suitable joints, e. g., tongue and groove, finger or scarf. Assuming for purposes of illustration only that tongue and groove joints are to be employed, the function of the first cutting unit 28 is to form a V-shaped groove at the leading end of each successive piece 22. For this purpose the end-cutting unit 28 has a pair of inclined circular saws or shaper knives 39 mounted on a gear box 40 and driven by a suitable motor 41. This assembly is mounted on a carriage 42 that is slidingly movable on a suitable guide bar 43 under the control of a suitable fluid-pressure actuator generally designated 44. The fluid-pressure actuator 44, which by preference operates hydraulically, is of a well known construction comprising a cylinder 45 with a piston rod 46 extending therefrom to a point of connection with the carriage 42.

In the construction shown, the guide bar 43 is adapted to move laterally to a slight degree in the course of the operating cycle and for that purpose it is pivotally mounted at an intermediate point on a suitable pedestal 48 and the rear end of the guide bar extending beyond the pedestal is operatively connected to a second fluid-pressure actuator 49 of the same type as the previously described actuator 44.

When the operating cycle of the cutting unit 28 is initiated by the photoelevtric cell 35, the fluid-pressure actuator 44 advances the carriage 42 on the guide bar 43 thereby causing the two circular cutting elements 49 to cut across the end of the stationary piece 22. The further advance of the carriage 42 brings a glue appliance 50 into contact with the cut end of the piece 22 for automatic application of glue to the newly cut groove. The glue appliance 50 comprises a nozzle to which glue without catalyst is applied under pressure by a hose 51, the nozzle being normally closed by suitable concealed valve means that is forced open whenever a flexible finger 52 extending forward from the nozzle brushes against the end of a piece 22.

After the application of glue by the appliance 50, the second actuator 49 swings the guide bar 43 laterally a slight distance away from the stationary piece 22 so that the carriage 42 may be returned by the first actuator 44 without the two rotary cutting elements 49 touching the newly applied glue. The cycle of operation is completed by the actuator 49 swinging the guide bar 43 back to its original position. At this point the clamp 47 automatically releases the piece 22 for resumption of travel along the series of conveyors.

While various types of glues may be used in various practices of the invention, a synthetic resin glue of the urea or resorcinol type is at present preferred and since the liquid glue supplied to the appliance 50 does not contain the usual catalyst, it will remain a free flowing liquid indefinitely.

The second automatic clamp 29 is of the same construction as the first automatic clamp 27 and has the same type of photoelectric control as indicated by the use of the same reference numerals. In this instance, however, the control box 36 having the photoelectric cell 35 closes the clamp and starts the operating cycle of the second cutting unit only when the trailing edge of a piece of wood 22 clears the light beam from the lamp 34. In other words, the light beam must not only be broken by the leading end of the piece but also restored by passage of the trailing end before the control box 36 responds.

The second end-cutting unit 30, like the first described unit, has a pair of inclined rotary saws or shaper knives 39 mounted on a gear box 40 and driven by a suitable motor 41. In this instance the combination is mounted on a carriage 54 that is slidingly mounted on a guide bar 55, the guide bar being rigidly mounted on a suitable pedestal 56. The operating cycle of this second end cutting unit consists of simple reciprocation of the two saws across the trailing end of the rigidly held piece 22 under the control of a fluid-pressure actuator 57 of the same construction as the previously described actuator 44. The clamp 29 automatically releases the piece 22 in response to completion of this operating cycle.

To completely prepare the piece 22 for end-to-end gluing it is now necessary to apply a coat of catalyst to the V-shaped end that has just been formed on its trailing end by the end-cutting unit 30. A suggested mechanism for this purpose comprises an automatic sprayer 59 having a suitable spray nozzle 60 to which liquid catalyst is supplied under pressure through a hose 61. When the trailing end of the piece 22 passes across the light beam 62 from a lamp 63, the photoelectric cell 64 in a control box 65 initiates operation of the automatic sprayer to coat the trailing end with catalyst.

Since there are three rows of pieces 22 converging on the assembly zone in Figure 2, the required preparation for joining the sides of the pieces together may be accomplished by applying catalyst to the opposite side surface of the pieces 22 in the central row, and applying glue to the inner side surface of the pieces 22 in the two outer rows.

The drawing shows two automatic catalyst sprayers 67 of the same type as the previously described sprayer 59, these two sprayers 67 being positioned to spray the opposite side surfaces of each piece 22 in the central row. For automatic operation, the two catalyst sprayers 67 are controlled by a control box 68 having a photoelectric cell 69 in the path of the light beam 70 from a lamp 71, the two sprayers operating whenever the light beam is cut off by a traveling piece 22.

The matching or adjoining side surfaces of the pieces 22 in the two outer rows may be coated by two glue appliances 73 respectively that are supplied with catalyst-free liquid glue under pressure by suitable supply hose 74. Each of the glue appliances 73 has a concealed discharge valve that is opened automatically whenever a flexible control finger 75 is displaced by contact with the side surface of a traveling piece 22. In such a well known valve construction the finger 75 is a stem integral with a valve head that is rocked to an open position by tilting of the stem.

*Assembly zone and preliminary processing zone*

As the three rows of pieces 22 converge into the assembly zone as shown in Figure 2, they form what may be termed a loose assembly of the general configuration of the desired final composite board, the individual pieces, however, being spaced from each other. Any suitable means may be employed to contract this loose assembly into a compact assembly with all the glue coatings in intimate contact with the corresponding catalyst coatings, and any suitable means may be used to maintain such compactness throughout the preliminary processing zone shown in Figure 3.

The drawings show, by way of example, the three conveyer systems for the three rows of pieces 22 converging to deliver the three rows of pieces onto what may be termed a conveyer table where the pieces are supported by a series of spaced freely-rotatable rollers 77 extending through the preliminary processing zone to the final processing zone. When the three rows reach this table, a preliminary set of rubber-tired traction rollers rotating relatively fast engage the successive pieces 22 of the three rows with relatively light contact to drive the pieces forward towards what may be called a main set of traction rollers 79 that rotate at somewhat slower speed and engage the pieces 22 with somewhat heavier frictional pressure. The differential in speed of the two sets of rollers causes the pieces 22 of each of the three rows to be crowded together, thus placing the traveling assembly under relatively light longitudinal pressure and at the same time the traveling assembly is placed under relatively light transverse pressure by a pair of convergent rubber-tired rollers 80 positioned between the two sets of traction rollers 78 and 79 as shown. The two rollers 80 make light frictional contact with the pieces 22 in the two outermost rows and are toed-in sufficiently and are driven at a sufficient rate with sufficient friction to draw the two outer rows of pieces inward against the central row.

This initial transverse and longitudinal contraction of the traveling assembly brings the glue and catalyst coatings together to start polymerization of the glue and the purpose of the apparatus in the preliminary processing zone shown in Figure 3 is to maintain the traveling assembly under such relatively light transverse and longitudinal pressure for a sufficient period of time to permit the glue-catalyst mixture to pass through what is known as the B stage flow that occurs just before the glue hardens.

It has been discovered that the glue penetrates the wood to maximum degree during this B stage flow and that such maximum penetration will be prevented if the assembly is prematurely placed under such high pressure as will cause excessive extrusion of the glue from the joints. It is for this reason that only relatively light transverse and longitudinal pressure is applied to the assembly throughout the preliminary processing zone.

Along the preliminary processing zone additional pairs of convergent rollers 80 may be provided as required to keep the traveling assembly under relatively light transverse pressure, one such additional pair 80 being shown in Figure 3. As for sustained relatively light longitudinal pressure, at the beginning of the final processing zone, the traveling assembly is gripped from opposite sides by a pair of traction wheels generally designated 81 which are incorporated in the first compression unit 21, and the fact that the two traction wheels 81 have less rapid traction effect on the traveling assembly than the previously mentioned main set of traction rollers 79 places the traveling assembly under the required relatively light longitudinal pressure throughout the preliminary processing zone. In other words, the peripheral speed of the main traction rollers 79 at the beginning of the preliminary processing zone is greater than the peripheral speed of the traction wheels 81 at the beginning of the final processing zone and the desired longitudinal crowding effect is caused by this differential.

As shown in Figure 3 additional sets of rollers 82 may engage the top surface of the traveling assembly as spaced points in the preliminary processing zone, to keep the assembly from buckling under the pressure. If desirable, some of the sets of rollers 82 may be braked lightly against rotation to provide a moderate amount of resistance to the forward movement of the assembly, thereby to cooperate in keeping the assembly under longitudinal pressure.

The length of the preliminary processing zone will be based both on the length of time required for the desired degree of preliminary polymerization of the glue and on the speed at which the assembly travels through the zone. The faster the rate of travel the longer the length of the preliminary processing zone, for a given time period of preliminary polymerization. In the preferred practice of my invention I provide a suitable mechanical vibrator 85 to vibrate the traveling assembly with sufficient force and at sufficient frequency to accelerate the mutual mixture of glue and catalyst and also to promote the penetration of the mixture into the fibre of the wood. Such a vibrator in shortening the time period required for preliminary polymerization of the glue, makes it possible to shorten the length of the preliminary processing zone.

*Final processing zone*

Any suitable arrangement may be used for dielectrically heating the traveling assembly by one or more cavity resonators or the like. Various kinds of cavity resonators may be employed, but I prefer one of the types set forth in a copending application entitled Apparatus for Drying Film by Dielectric Heating, Serial No. 142,744, filed by Frank Wilburn and myself on February 7, 1950, or as set forth in a copending application entitled Means and Method for Heating Dielectric Material, Serial No. 198,850, filed by the same inventors on December 2, 1950, which two prior disclosures are hereby incorporated in the present disclosure by reference. Some of the important advantages in the use of such cavity resonators for the present purpose may be pointed out as follows.

In the first place, a cavity resonator affords better penetration of the traveling material on the part of the radio frequency energy than is possible with electrodes, especially so since a cavity resonator may function in the ultra high frequency spectrum and with exceptionally high power output.

In the second place, a cavity resonator can project the high frequency energy into the traveling material at the desired rate and to the desired depth without making any actual physical contact with the material. Such projection of the electric field into the material without contact therewith may be accomplished either by a displacement of the electric field into the material occurring entirely inside the cavity resonator, or may be accomplished in large part by radiation of the energy from an aperture in the cavity outward into the traveling material with the path of the material entirely outside the cavity.

In the third place, the use of a cavity resonator offers a certain flexibility of control that is highly useful in dielectric heating. The electric field may be given any desired orientation relative to the material in progress, may be regulated in depth of penetration, may be regulated in area of effectiveness, and, finally, may have various density patterns as desired.

In the fifth place, a cavity resonator in eliminating flash-overs, and arcing, avoids damage to the material from these causes that are so often encountered in the use of electrodes in dielectric heating.

In the sixth place it has been found that a glue bond cured over a relatively long period of dielectric heating at relatively low heat intensity is much stronger than a glue bond cured over a shorter time period at the high intensity that is necessarily characteristic of the use of electrodes. Cavity resonators are admirably suited for this longer milder processing. Any desired number of cavity resonators may be arranged in series to treat the traveling material at successive points at any temperature desired and to any depth desired.

In the seventh place, the electric field produced by a cavity resonator cures the so-called flash or glue extruded to the surface of the assembly. Electrodes are not efficient in this respect and leave the extruded glue immediately adjacent the electrodes in an uncured gummy state that causes considerable trouble in subsequent handling and processing of the product. In contrast, a cavity resonator so thoroughly polymerizes the extruded glue that the composite board can be immediately machined by wood working equipment with the same freedom and lack of trouble as in the case of a plain dry board.

The design and construction of equipment for the final processing zone is based on the intensity of heat treatment desired, the desired duration of the treatment, and the desired rate of travel of the material in process. For a given time period of treatment, the length of the final processing zone, which in practice means the number of resonators, will vary directly with the desired speed of travel. In the present example, four cavity resonators 20 of the type shown in the drawings, will process the described assembly traveling at a rate of 10 feet to 200 feet per minute and at that rate will bring the glue temperature up to the range of 220–300° F.

A cavity resonator 20 of the type shown in the drawings, which is described in detail in the above-mentioned copending applications, is what may be termed a modified re-entrant cavity resonator having relatively closely spaced capacitance walls 86 and 87 (Figure 5), and inductance walls in the form of loops or open ended lobes 88 and 89. The two lobes have the configuration of hollow cylinders whose interior diameter may be three or more times the spacing distance between the capacitance walls 86 and 87, and are integrally joined to the capacitance walls. I have found that, for a strip of material such as the described traveling assembly, the resonators 20 may be about 48" in length (measured transversely of the traveling assembly) and about 12" in width with the walls 86 and 87 spaced about 1½" apart. The lobes 88 and 89 may be, for example, 9" in inside diameter.

Figure 5:
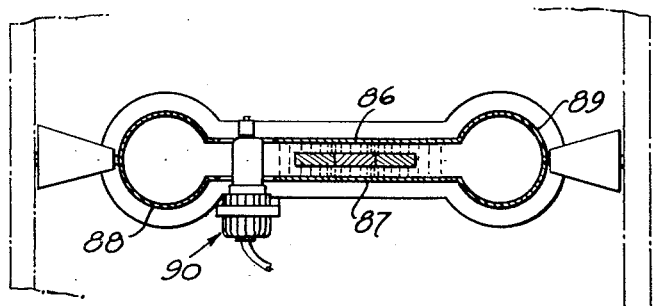
Figure 5 is a sectional view of one of the cavity resonators taken on the line 5—5 of Figure 3.

While such a resonator may be energized in any suitable manner, I prefer a high frequency generator of the construction described in said copending applications. Such a generator may include a high frequency oscillator tube 90 positioned as shown in Figure 5, and extending through both capacitance walls 86 and 87. Any suitable energizing circuit may be employed, as will be well understood by those skilled in the art. The circuit shown in said copending applications is suitable. When such a cavity resonator is placed in operation, a high intensity electric field is established between the two capacitance walls 87 and 86, and because of the re-entrant configuration of the resonators, this field is concentrated in the central third of the resonator and is more or less uniformly distributed in that central region.

The floating compression assembly in which the four cavity resonators 20 are incorporated comprises five of the previously mentioned compression units 21 positioned alternately with the resonators so that the traveling assembly is subjected to transverse pressure both as it enters and as it leaves each of the four resonators. It will be apparent to those skilled in the art that other suitable arrangement may be used to keep the traveling assembly under pressure as it goes through the final processing zone.

Figures 6, 8, 9:
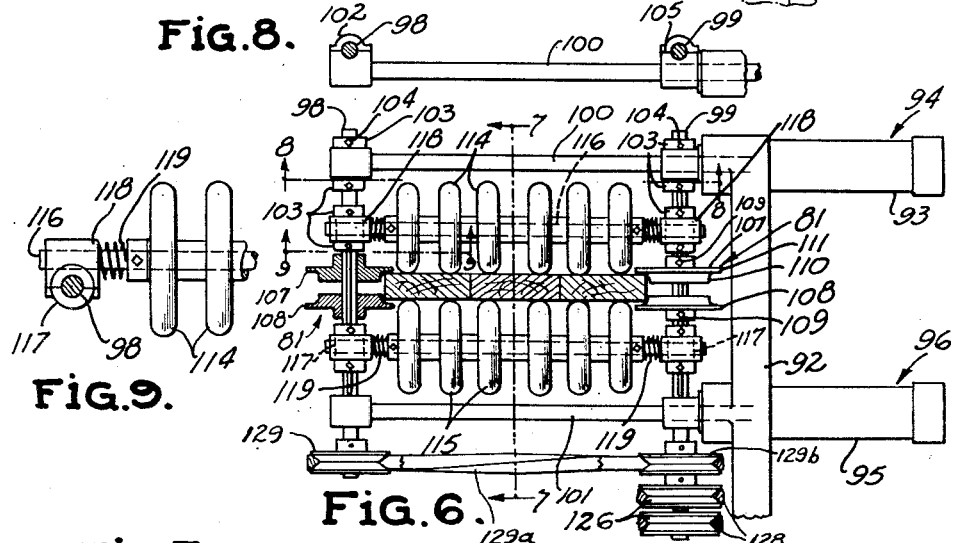
Figure 6 is a section taken along the line 6—6 of Figure 3 showing one of the compression units of the apparatus in elevation.
Figure 8 is a section taken as indicated by the line 8—8 of Figure 6.
Figure 9 is a slightly enlarged section taken as indicated by the line 9—9 of Figure 6.
Figure 7:
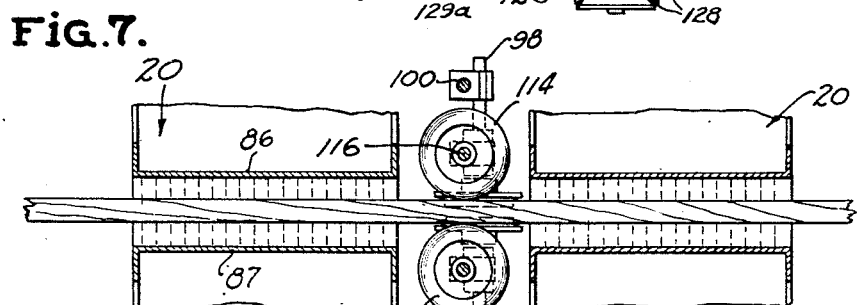
Figure 7 is a section taken along the line 7—7 of Figure 6.

As best shown in Figure 6, each compression unit 21 is supported on one side of the traveling assembly by a vertical frame 92 in which is solidly mounted a cylinder 93 of an upper fluid-pressure-actuated means generally designated 94 and a cylinder 95 of a lower fluid-pressure-actuated means generally designated 96. The purpose of the two fluid-pressure-actuated means 94 and 96 is to urge a vertical drive shaft 98 on one side of the traveling assembly toward a second similar vertical drive shaft 99 on the other side of the traveling assembly, thereby to place the traveling assembly under the desired relatively high transverse pressure desired in the final processing zone. To carry out this purpose the vertical drive shaft 98 is suitably mounted on the outer end of piston rods 100 and 101, that extend out from the two cylinders 93 and 95, respectively, and the other vertical drive shaft 99 is suitably mounted on the two cylinders. Preferably hydraulic force is used but compressed air may be used.

To support the vertical shaft 98, the two piston rods 100 and 101 are provided at their outer ends with suitable split bearings 102 surrounding the shaft and suitable collars 103 flanking each of these bearings are secured to the shaft by suitable set screws 104. In like manner the second vertical shaft 99 is mounted in suitable split bearings 105 on the two cylinders 93 and 95 with each bearing flanked by two of the collars 103.

Each of the two vertical shafts 98 and 99 carries one of the previously mentioned traction wheels 81, and, as shown in Figure 6, each of these traction wheels may be made in two separator parts 107 and 108 to provide adjustability to engage effectively traveling material of various thicknesses. Each of the two parts 107 and 108 is slidingly keyed on the drive shaft for adjustability and is releasably held by a set screw 109. Each part has a cylindrical portion 110 to press against the side surface of the traveling assembly and a radial flange 111 to extend over the margin of the adjacent surface of the traveling material, as shown.

When a traveling assembly of the character described is placed under pressure edgewise amounting to as much as 200 lbs. per square inch as contemplated here, it is necessary to confine the traveling assembly in a suitable manner to prevent buckling. For this purpose each of the compression units 21 includes two sets of anti-buckling rollers, an upper set of rollers 114 and lower set of rollers 115 between which the traveling assembly passes. Such rollers may be mounted in any suitable manner.

In the construction shown, each of the two sets of anti-buckling rollers includes a shaft 116 on which individual rollers are rotatably mounted, and this shaft is supported at its opposite ends by split bearings 117 mounted on the two vertical shafts 98 and 99 respectively, each bearing being flanked by two collars 103. To avoid interference with the floating action of the two piston rods 100 and 101 the opposite ends of the shaft 116 are slidingly retained by sockets 118 integral with the two bearings 117, the shaft and the sockets being dimensioned for a range of telescoping action sufficient to permit normal retraction and extension of the two piston rods as they follow minor variations in the transverse dimension of the traveling assembly. Suitable helical springs 119 may be interposed between the sockets 118 and the adjacent anti-buckling rollers, as shown, to tend to keep the shaft 116 centered.

It has already been pointed out that the traction wheels 81 of the compression unit 21 are adjustable to accommodate traveling assemblies of various thicknesses, and it is contemplated that the compression units will also be adjustable for various widths of traveling assemblies. For this purpose the apparatus may include any number of substitute sets of anti-buckling rollers mounted on shafts of various lengths. To change a compression unit 21 over from one width to another it is merely necessary to extend the two piston rods 100 and 101 sufficiently to release the two shafts 116 carrying the anti-buckling rollers on shafts of the lengths required. Since the collars 103 that retain the bearings 117 in place are adjustable vertically the sets of anti-buckling rollers are adjustable for various thicknesses of traveling material.

It is highly desirable that all of the adjoining surfaces of the pieces 22 that make up the traveling assembly be placed under substantially equal pressure by the compression units 21, and it is important, therefore, that there be no frictional contact with the traveling material on the part of the apparatus that will interfere with pressure distribution across the assembly. For this reason it is contemplated that the individual anti-buckling rollers 114 will have smooth peripheral surfaces, and in addition each of the individual rollers may be given a certain freedom for lateral movement. If desired, the individual rollers may be swiveled for complete freedom of action.

Figures 10, 11:
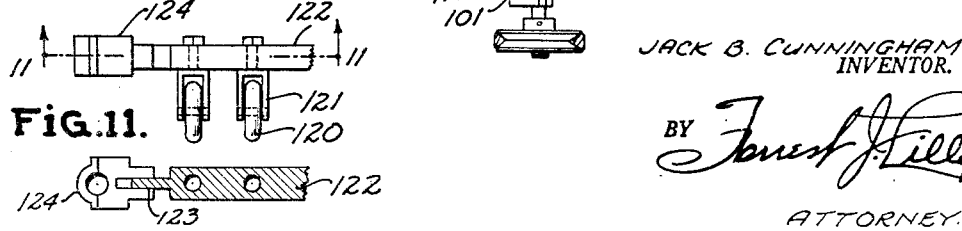
Figure 10 is a fragmentary side elevation of a set of anti-buckling rolls that may be substituted in the compression unit shown in Figure 6.
Figure 11 is a section taken as indicated by the line 11—11 of Figure 10.

Figures 10 and 11 show, by way of example, how a set of swiveled anti-buckling rollers 120 may be constructed for use in the described compression units 21. The individual rollers 120 are mounted in swivel brackets 121 that are in turn rotatably mounted in a cross bar 122. The opposite ends of the cross bar 122 are reduced in thickness to slidingly enter complementary sockets 123 formed in split bearings 124 that correspond to the previously mentioned split bearings 117 and may be substituted therefor.

The two vertical shafts 98 and 99 carrying the traction wheels 89 may be driven in any suitable manner that will not interfere with the required freedom for floating action on the part of the compression unit 21. In the particular arrangement shown in Figures 4 and 6, each of the vertical shafts 98 carries on its lower end a pair of sheaves 126 engaged by suitable V-belts. The shaft 98 of the compression unit at the beginning of the final processing zone is driven by a motor (not shown) by means of a drive belt 127 engaging one of its pulleys 126. A succession of similar belts 128 interconnect the sheaves 126 on the vertical shafts 99 on one side of the apparatus as indicated in Figure 4 so that all of the vertical shafts 99 are driven by the same motor. The vertical shafts 98 carry sheaves 129 connected and driven by crossed belts 129a from sheaves 129b on shafts 99.

It is apparent that the relatively high transverse pressure across the traveling assembly required in the final processing zone is adequately applied by the fluid-pressure-actuated means 94 and 95. It is contemplated that the required simultaneous relatively high longitudinal pressure will be applied to the traveling assembly by arranging for the series of traction wheels 81 to have progressively decreasing traction velocity effect on the assembly as the assembly travels through the final processing zone. In other words, it is contemplated that each pair of traction wheels 81 in a compression unit 21 will tend to move the traveling assembly faster than the next succeeding pair of traction wheels 81 in a direction of travel, thus longitudinally crowding the traveling assembly to a high degree.

Obviously this longitudinal crowding effect may be accomplished either by making all of the traction wheels 81 of the same diameter and driving the traction wheels at different rates, or by using traction wheels of progressively smaller diameters and driving all at the same rate. The former arrangement is preferred. Thus the traction wheels 81 are of the same diameter but the sheaves 126 on the vertical drive shafts 98 and 99 are progressively increased in diameter towards the discharge end of the final processing zone, so that each succeeding pair of traction wheels 81 is driven at a somewhat slower rate than the previous pair.

The use of other types of cavity resonators

As disclosed in said copending applications, various types of cavity resonators may be used with apparatus of the character herein described for the continuous processing of traveling material.

Figure 12:
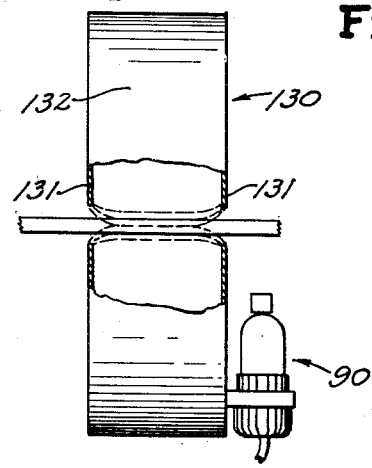
Figure 12 is a side elevation of an alternate form of cavity resonator that may be used, the figure being partly broken away.
Figure 13:
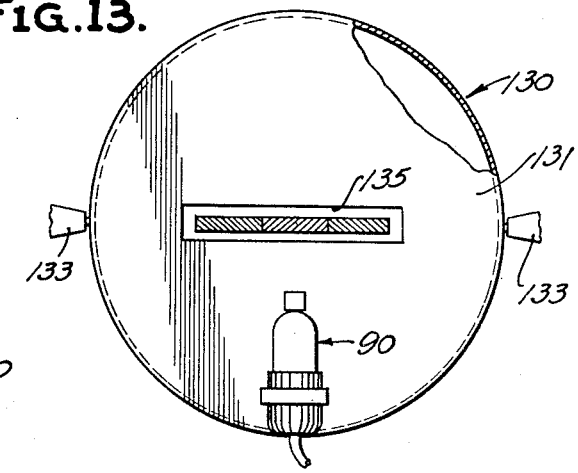
Figure 13 is a face view of the same cavity resonator.

The cavity resonator generally designated 130 in Figures 12 and 13, for example, may be substituted for the previously described cavity resonators 20 in the final processing zone. The cavity resonator 130 is drum-shaped with two parallel capacitance walls 131 interconnected by a circumferential inductance wall 132. The cavity resonator is mounted on suitable supports 133 and is energized in a suitable manner by a radio frequency generator including a vacuum tube 90.

In this instance, each of the capacitance walls 131 has a suitable slot or aperture 135 to permit the traveling assembly to pass through the cavity resonator as shown in Figures 12 and 13. Since the electric field created in the cavity resonator 130 extends from one of the capacitance walls 131 to the other, it is apparent that the electric field extends in the direction of travel of the material passing through the resonator. This longitudinal alinement of the electric field corresponds to the alinement of the longitudinal glue layers in the traveling assembly and these glue layers with their relatively high moisture content offer paths of high dielectric constant for the electric field, especially so since the layers lie edgewise with no thickness of wood between the glue and the source of the electric field. The result is of course a concentration of the electric field in the glue layers, and more rapid heating of the latter than of the wood.

It is also to be noted that with the longitudinal alinement of the electric field with respect to the direction of travel of the material, the time period of exposure of a given material article to the heat effect of the electric field for a given rate of material travel is prolonged. Often it is desirable as heretofore mentioned to use longer than usual time periods of treatment at lower than usual heat intensity.

When the electric field passes transversely through the traveling material as shown in Figure 5, the voltage gradient through the material is relatively high for a given voltage difference between the two capacitance walls of the resonator. An advantage of the longitudinal alinement of the electric field by the cavity resonator 130 is that the lines of the field traverse much longer paths through the material and thus provide a relatively low voltage gradient in the material for a given voltage difference between the capacitance plates of the resonator when such a voltage gradient is desirable.

Figure 14:
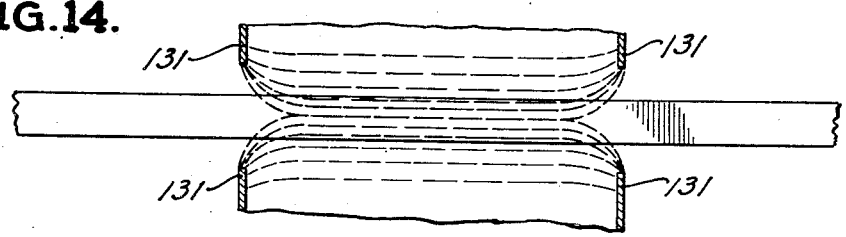
Figure 14 is a diagrammatic view to show how the electric field produced by the resonator in Figure 12 is projected into the traveling material.
Figure 15:
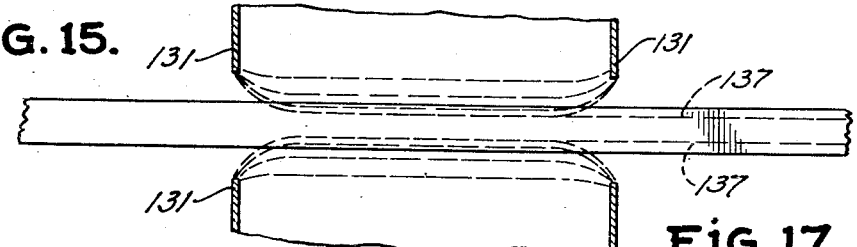
Figure 15 is a similar view showing how the electric field may penetrate the material from opposite sides to relatively shallow depths.

A further important advantage of passing material through the resonator in the manner exemplified by Figures 12 and 13 is that the material is heat treated from opposite sides simultaneously and the depth of penetration of the lines of force may be controlled as desired. Figure 14 shows the traveling material completely penetrated by the electric field entering from opposite sides. Figure 15, on the other hand, shows how the electric field may be controlled to make only relatively shallow effective penetration from opposite sides of the traveling assembly, thus curing only marginal portions of the glue layers, such marginal portions being indicated by dotted lines 137.

There are two important advantages in using cavity resonators of the type shown in Figures 12 and 13 in the final processing zone of the apparatus with the resonators adjusted for relatively shallow penetration as indicated in Figure 15. One advantage is the saving in power since less power is required for the shallow penetration. The cured margins of glue 137 may be depended upon to hold the assembly together without pressure after it leaves the final processing zone so that the deeper central portions of the glue layers may subsequently cure gradually at lower temperatures over a period of time. The ultimate strength of the glue bond is actually increased by this delayed curing of the inner portions of glue.

The second advantage resides in the uniform stressing of the traveling assembly by the heat treatment. One of the problems that is especially troublesome when traveling material is subjected to intense heat treatment throughout its thickness is the unequal stressing of the material. Such inequality is created largely because the heating effect tends to concentrate in the glue layers with consequent steep temperature gradients. In contrast the shallow penetration of the traveling material represented by Figure 15 localizes the temperature gradients, reduces the magnitude of the stresses and in addition balances the stresses on one side of the traveling assembly against the stresses on the opposite side. Thus there is no tendency for the traveling assembly to warp under the heat treatment, because the heat treatment itself is at a relatively low intensity, the stresses are balanced on the opposite sides of the assembly and, moreover, the deeper lying portions of the traveling material are not stressed.

Figure 16:
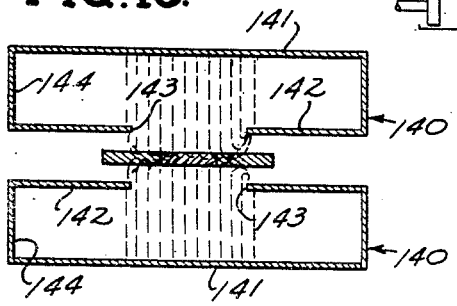
Figure 16 is a sectional view of another cavity resonator arrangement that may be used in practicing the invention.

Figure 16 shows by way of further example how two drum-shaped cavity resonators may be arranged on opposite sides of the traveling material to project energy into the traveling assembly largely by radiation. Each of the two resonators 140 in Figure 16 has a continuous or unbroken capacitance wall 141, a parallel capacitance wall 142 with a suitable aperture or slot 143 and has the usual circumferential inductance wall 144. The aperture or slot 143 is provided for radiation of the electromagnetic energy into the material of the traveling assembly. The depth of penetration of the electric field produced and radiated in this manner may be regulated by the suitable selection of physical and electrical parameters including the physical dimension of the cavity resonator, the dimensions of the apertures 143, the frequency of the electric power, and the spacing of the two resonators 140 from the material of the traveling assembly.

Figure 17:
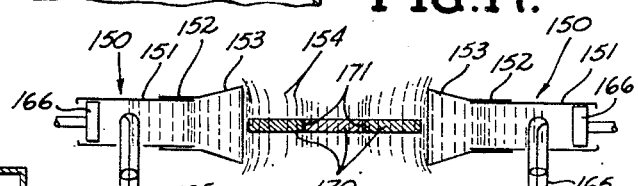
Figure 17 is a sectional view of a wave guide arrangement capable of utilization in the practice of the invention.

Figure 17 shows by way of a still further example how two wave guides may be arranged on opposite sides of the traveling material to project energy into the traveling material. The distinction between resonant wave guides and resonant cavities is not clearly established, and the wave guides of Figure 16 may in certain circumstances fulfill the requirements of the invention. The apparatus of Figure 17 embodies two wave guide devices 150, each comprising two telescopic wave guide sections 151 and 152, the latter provided with a bell mouth or horn 153 for ejection of the electric field indicated in appropriate intensity gradients by the dashed vertical lines 154.

Electrical energy is fed into each wave guide through a concentric line 165 from any suitable source of radio frequency power, not illustrated. The radio frequency power should be controllable in frequency for tuning purposes. A tuning or matching plunger 166 may be employed to establish desirable electrical characteristics of the wave guide, which has impedance and resonant characteristics determined by the physical dimensions of the wave guide and by the frequency of the power and the electrical characteristics of the work. In this instance the work comprises an assembly of wooden strips 170 and adjoining longitudinal glue lines 171. As shown in Figure 17, the two wave guides are axially alined and spaced apart for the material to be passed therebetween. The direction of travel of the work in this instance is through the common axis of the two wave guides, so that the two glue planes 171 are parallel to the lines of the electric field.

By adjustment of the power, frequency, guide length and the spacing of the work from the wave guide, the work may be made to establish either a proper impedance match to the guide or resonance in the system. In either or both cases, the zone in which the maximum electrical energy from one of the wave guides is dissipated, and hence the zone of greatest heating, may be made to occupy a definite position in the work by suitable variation of the electrical and physical parameters described above. Thus two zones of maximum energy dissipation may be made to coincide with the two parallel glue planes 171, as indicated by the concentration of the electrical field lines in the region of said glue planes. Again, as with certain of the cavity forms of the invention described in the foregoing, the electric field has been established in coincidence with the glue planes, and this has been accomplished without physical engagement between the electrode members and the work.

My disclosure of the preferred practice of the invention with certain modifications by way of suggestion will indicate to those skilled in the art various changes and departures from my disclosure that may be made in the spirit and scope of the appended claims without departing from the invention.

I claim:

1. In an apparatus of the character described for uniting pieces of dielectric material for the continuous fabrication of a composite body, the combination of: means to apply a coat of glue to one of each pair of surfaces that are to adjoin each other in the finished body; means to apply a coat of catalyst to the other of each pair of surfaces; means to move the pieces in assembly order continuously through a preliminary zone and a final processing zone; means to press the pieces together in said preliminary zone to bring the glue and catalyst together to start curing of the glue; and a plurality of cavity resonators in said final zone to create high frequency fields to accelerate the curing of the glue.

2. In an apparatus of the character described for uniting an assembly of pieces of dielectric material with alternate layers of heat-responsive glue to produce an elongated composite body, the combination of: a plurality of pairs of rollers positioned to abut the assembly from opposite sides at longitudinally spaced points; means to hold the assembly in transverse alinement between said rollers; a plurality of pairs of hydraulic piston rods transversely straddling said assembly; shafts respectively supported between the ends of said pairs of piston rods on one side of the assembly, said rollers on said one side of the assembly being secured to said shafts respectively; and hydraulic cylinders operatively receiving the ends of said piston rods on the other side of said assembly whereby, the rollers on said one side are adapted to be hydraulically pulled towards the rollers on the other side to compress the assembly transversely; means to drive said rollers thereby to move the assembly longitudinally while it is under transverse compression; and means to cure said glue with high frequency cavity generated electric energy while the assembly is moving under transverse compression.

3. A method of uniting pieces of dielectric material for the production of an elongated composite body including the steps of: assembling the pieces in positions relative to each other to form an elongated assembly of the desired body configuration; applying heat-responsive glue to the adjoining surfaces in the assembly; placing the assembly under pressure across the planes of said surfaces; and while under such pressure passing the assembly longitudinally through a high frequency cavity-generated electric field at a speed adjusted to heat the opposite marginal portions of said glue surfaces without curing the intermediate portions of the glue surfaces in the time interval the assembly is exposed to the energy generated by the resonator, whereby the assembly may be released from pressure to be held together by said marginal portions for subsequent low temperature curing of said intermediate portions.

4. A method of uniting an assembly of pieces of dielectric material to produce a composite body, including the steps of: applying a glue coating to one of each pair of surfaces of said pieces that are to be contiguous where the pieces are to be bonded together in the finished body; applying a coating of catalyst for the glue to the other surface of the pairs of surfaces; contracting the assembly to bring said glue and catalyst coatings together to start curing of the glue; holding the assembly contracted under relatively low pressure for a period of time to permit the glue to penetrate the pieces of dielectric material; then applying relatively high contracting pressure to the assembly and while the assembly is under high pressure exposing the assembly to a high frequency cavity generated electric field to heat said glue for final polymerization.

5. A method of uniting an assembly of pieces of dielectric material to produce a composite body, including the steps of: applying a glue coating to one of each pair of surfaces of said pieces that are to be contiguous where the pieces are to be bonded together in the finished body; applying a coating of catalyst for the glue to the other surface of the pairs of surfaces; contracting the assembly to bring said glue and catalyst coatings together to start curing of the glue; holding the assembly contracted under relatively low pressure for a period of time to permit the glue to penetrate the pieces of dielectric material; vibrating the contracted assembly during said period to encourage intermixture of the glue and catalyst and to encourage penetration of said surfaces by the glue; then applying relatively high contracting pressure to the assembly and while the assembly is under high pressure exposing the assembly to a high frequency cavity generated electric field to heat said glue for final polymerization.

6. An apparatus according to claim 2 including means to drive the successive pairs of rollers at progressively decreasing peripheral speed thereby to move the transversely compressed assembly longitudinally and simultaneously compress the assembly longitudinally; said high frequency electric energy being generated within a cavity resonator.

References Cited in the file of this patent
UNITED STATES PATENTS

| | | |
|---|---|---|
| 1,702,185 | Weber | Feb. 12, 1929 |
| 2,038,510 | Goff | Apr. 21, 1936 |
| 2,071,999 | Dike | Feb. 23, 1937 |
| 2,190,712 | Hansen | Feb. 20, 1940 |
| 2,461,372 | Collins | Feb. 8, 1949 |
| 2,490,819 | Lambert et al. | Dec. 13, 1949 |
| 2,495,175 | Nagel | Jan. 17, 1950 |
| 2,521,993 | Parker | Sept. 12, 1950 |
| 2,571,604 | Payzant | Oct. 16, 1951 |
| 2,603,741 | Seifried | July 15, 1952 |